United States Patent [19]
Furumura et al.

[11] Patent Number: 5,475,654
[45] Date of Patent: Dec. 12, 1995

[54] INTERMITTENT OPERATION CIRCUIT

[75] Inventors: Takashi Furumura; Megumi Chiba, both of Hyogo, Japan

[73] Assignees: Mitsubishi Electric Semiconductor Software Co., Ltd., Itami; Mitsubishi Denki Kabushiki Kaisha, Tokyo, both of Japan

[21] Appl. No.: 441,380

[22] Filed: May 15, 1995

[30] Foreign Application Priority Data

Nov. 24, 1994 [JP] Japan ..................................... 6-289667

[51] Int. Cl.⁶ ............................... G04B 47/00; G04B 1/00
[52] U.S. Cl. ............................. 368/10; 368/204; 364/707
[58] Field of Search .................... 368/10, 64, 66, 368/156, 203–205; 364/565, 707; 395/750

[56] References Cited

U.S. PATENT DOCUMENTS

| | | | |
|---|---|---|---|
| 4,780,843 | 10/1988 | Tietsen | 364/900 |
| 4,851,987 | 7/1989 | Day | 364/900 |
| 5,189,647 | 2/1993 | Suzuki et al. | 368/10 |
| 5,325,074 | 6/1994 | Suenaga | 368/204 |
| 5,347,472 | 9/1994 | Todkowa | 364/569 |

*Primary Examiner*—Vit W. Miska
*Attorney, Agent, or Firm*—Oblon, Spivak, McClelland, Maier, & Neustadt

[57] ABSTRACT

An intermittent operation circuit provided with a charge/discharge means in which, when a central processing means stops the operation of an internal clock oscillating means, a charging is started after discharging stored charges, and provided with an interruption control means which starts the operations of the internal oscillating means and the central processing means when a charge level of the charge stored in the charge/discharge means is once lowered and then the charge level reaches or exceeds a predetermined value, thereby, when the central processing means is in the stop mode, the operation of the processing means can be restored, without operating the timer and the internal clock oscillating means, resulting in that the consuming power of the circuit system can be further reduced than in the prior art.

4 Claims, 9 Drawing Sheets

FIG. 9
PRIOR ART

| SWITCH, OSCILLA-TING MODE<br>OPERATION OF CPU | SWITCH6 | SWITCH7 | OSCILLATING CIRCUIT3 |
|---|---|---|---|
| NORMAL OPERATION | ON | ON | OPERATING |
| EXECUTE POWER OFF INSTRUCTION A | OFF | ON | OPERATING |
| EXECUTE POWER OFF INSTRUCTION B | OFF | OFF | STOP |

INTERMITTENT OPERATION CIRCUIT

BACKGROUND OF THE INVENTION (1) Field of the Invention

The present invention relates to an intermittent operation circuit for intermittently operating a CPU or the like to attain a low consuming power in a computer peripheral device.

(2) Description of the Prior Art

FIG. 7 is a block diagram illustrating a conventional intermittent operation circuit. In FIG. 7, the reference numeral 1 designates a single chip microcomputer, 2 an oscillator, and 3 an oscillation circuit. An internal clock oscillating means for generating an internal clock is composed of the oscillation circuit 3 and the oscillator 2.

The reference numeral 4 designates a CPU which operates in synchronism with the internal clock signal generated by the oscillating circuit 3, 5 a timer which divides an internal clock signal generated by the oscillation circuit 3 and counts the divided clocks, and generates a timer interruption in the CPU 4 in a state where the count value is reduced to lead to an underflow, 6 a switch which connects the oscillation circuit 3 to the CPU 4, and 7 a switch which connects the oscillation circuit 3 to the timer 5.

The operation of the intermittent operation circuit will now be described.

When, the microcomputer 1 is in the normal operation mode, the switches 6 and 7 are in the ON state and the oscillation circuit 3 is in the operation mode. Accordingly, an internal clock signal is always supplied from the oscillation circuit 3 to the CPU 4 and the timer 5, so that the operation mode is maintained.

Nevertheless, depending on the employed system, the CPU 4 is not always required to operate. Rather, there is a case in which it is sufficient that the CPU 4 operates intermittently at a constant time interval. Therefore, if the CPU 4 is operated intermittently at a constant period and the operation of the CPU 4 is stopped at other periods, the consuming power of the system can be reduced.

In this prior art, the CPU 4 repeats the operation mode and the stop mode (low consuming power mode) at a constant period as shown in FIG. 8. To carry out this repetition in a case where the operation is transferred to the stop mode, the switch 6 is turned to the OFF state when the CPU 4 finishes the operating mode as shown in FIG. 9. This operation is hereinafter referred to as an execution of the power off instruction A.

After this, the internal clock signal is not supplied from the oscillation circuit 3 to the CPU 4, so that the CPU 4 is switched to the stop mode. However, in this case, the switch 7 maintains the ON state and the internal clock is supplied from the oscillation circuit 3 to the timer 5, thereby maintaining the operation mode.

Then, when the CPU 4 is switched to the stop mode, the timer 5 divides the internal clock signal supplied from the oscillation circuit 3 and starts counting the divided signal. When the count value is reduced to lead to an underflow, that is, when a period T2 has passed after the CPU 4 is switched to the stop mode, the switch 6 is turned to the ON state and a timer interruption is generated in the CPU 4, whereby the operation of the CPU 4 is restored. Consequently, the CPU 4 is switched to the operation mode again, so that the intermittent operation of the CPU 4 is attained.

As shown in FIG. 9, in a case where the switch 6 is turned to the OFF state, and simultaneously the switch 7 is turned to the OFF state and the operation of the oscillation circuit 3 is stopped (these three simultaneous operations are hereinafter referred to as the execution of the power off instruction B), the operation of the timer 5 can also be stopped. Therefore, the consuming power in the execution of the power off instruction B can be further reduced than in the execution of the power off instruction A. However, when the power off instruction B is executed, a timer interruption cannot be generated from the timer 5 so that the operation of the CPU 4 cannot be restored and the intermittent operation of the CPU 4 cannot be attained.

A conventional intermittent operation circuit is so constructed as described above. Hence, the timer 6 and the oscillation circuit 3 must be operated at all times to attain the intermittent operation of the CPU 4. Therefore, there is a problem in that the consuming power of the circuit system cannot be significantly decreased.

SUMMARY OF THE INVENTION

The present invention has been made to solve the above described problem. The object of the invention is to obtain an intermittent operation circuit in which an operation of a CPU can be restored without operating a timer and an oscillation circuit, thereby further decreasing the consuming power of the circuit system than in a conventional circuit.

To attain the above described object, according to a first aspect of the present invention, there is provided an intermittent operation circuit comprising: charge/discharge means in which when a central processing means stops an internal clock signal oscillating means, stored charges are once discharged and charging is started, and an interruption control means in which when the charge level of the charge/discharge means is once lowered and then the charge level is raised to a predetermined value or more, the operations of the internal clock oscillating means and the central processing means are started again.

According to a second aspect of the present invention, the charge/discharge means comprises a series circuit of a power source, a resistor and a capacitor.

According to a third aspect of the present invention, a waveform shaping means for shaping the waveform of the terminal voltage of the capacitor in the charge/discharge means into a linear waveform is provided and a charging level of the charge/discharge means is determined on the basis of the waveform shaped by the waveform shaping means.

According to a fourth aspect of the present invention, the charge/discharge means comprises a charge storage means for storing the electric charges and a charge/discharge switching means in which when the central processing means stops the operation of the internal clock oscillating means, the charges stored in the charge storing means are discharged and after the discharge, charging with the charge storing means is started.

As stated above, according to the first aspect of the present invention, when the central processing means is in the stop mode, the operation of the central processing means can be restored without operating the timer and the clock oscillating means.

According to the second aspect of the invention, the stop time of the central processing means can be set by only setting the values of a resistor and a capacitor.

According to the third aspect of the invention, the charging level of the charge/discharge means is determined on the basis of the waveform shaped by the waveform shaping means. Accordingly, even in a case where the stop time of the central processing means was set to a long time, the charging level of the charge/discharge means can be accurately determined. According to the fourth aspect of the invention, the charge/discharge switching means is controlled by the central processing means. Accordingly, the charge/discharge is appropriately executed, whereby the operation of the interruption control means is secured.

The above and further objects and novel features of the invention will be more fully explained in the following detailed description of the preferred embodiments when the same is read in connection with the accompanying drawings. It is to be expressly understood, however, that the drawings are for the purpose of illustration only, and not intended as a definition of the limits of the invention.

BRIEF DESCRIPTION OF THE DRAWINGS

FIG. 9 is a table showing the operations or the like of the CPU.

DESCRIPTION OF THE PREFERRED EMBODIMENTS

Embodiment 1

An embodiment (embodiment 1) will be described in connection with the accompanying drawings.

Figure 1:
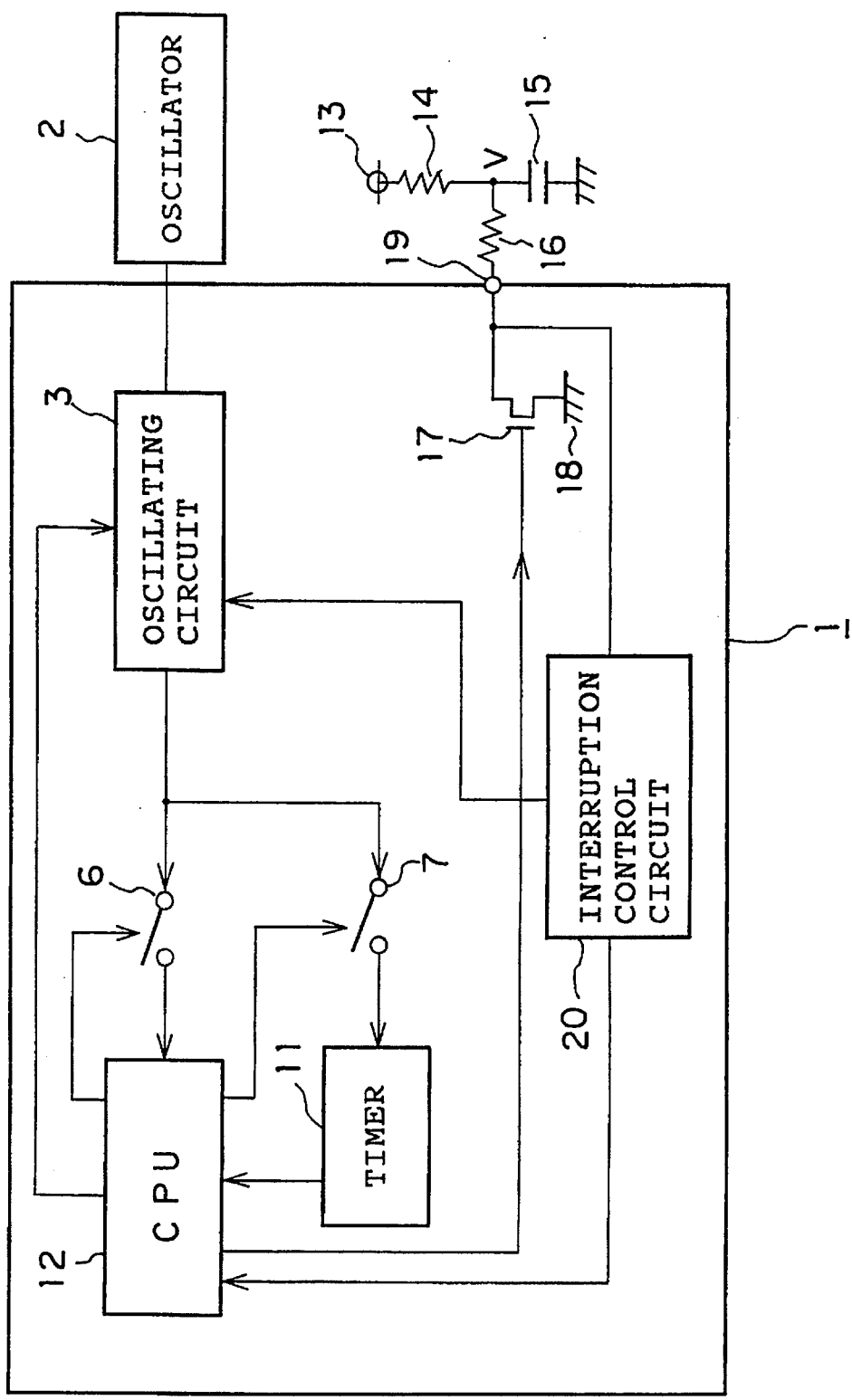
FIG. 1 is a block diagram illustrating an intermittent operation circuit according to the embodiment 1 of the present invention.
Figure 4:
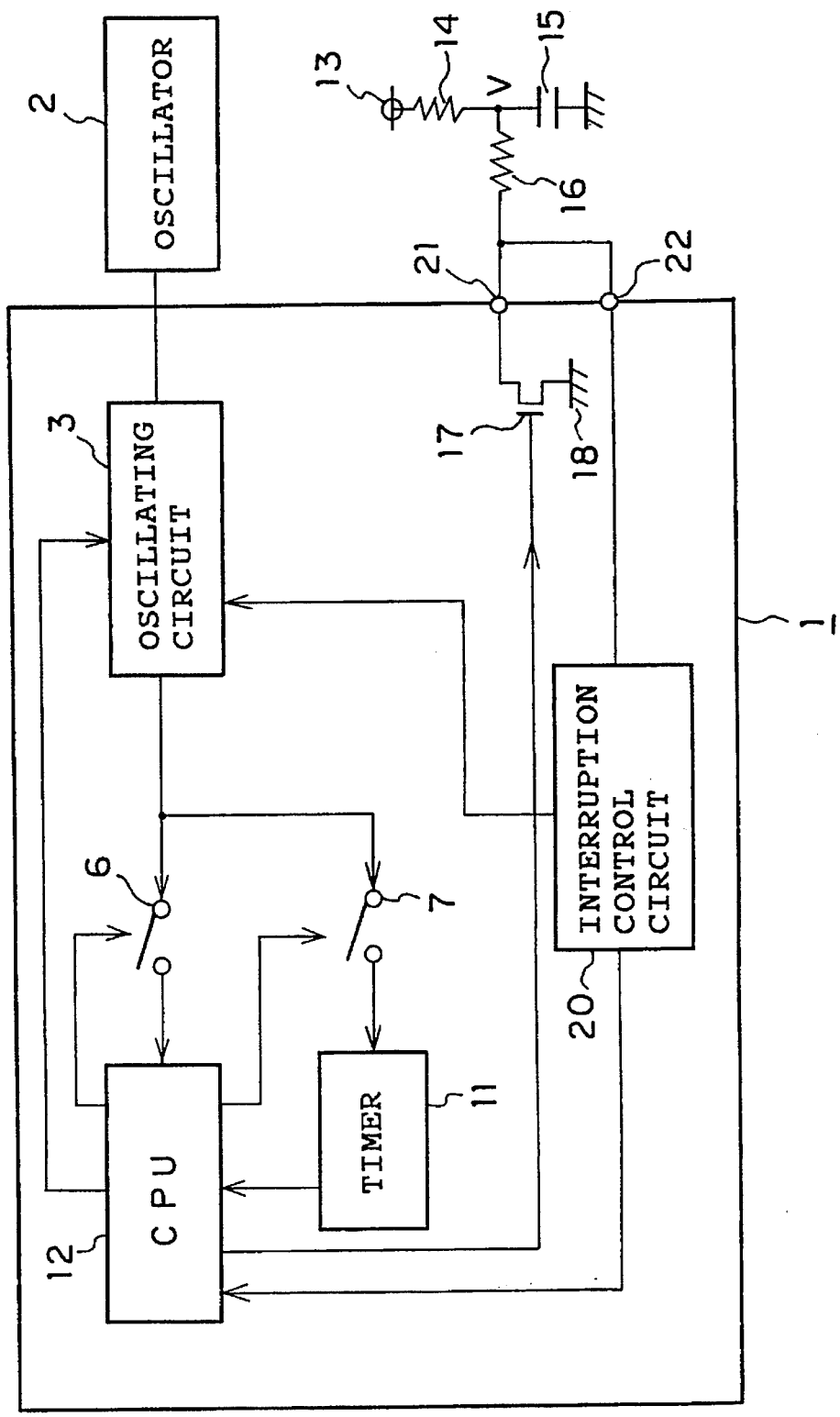
FIG. 4 is a block diagram illustrating an intermittent operation circuit according to the embodiment 2 of the present invention.

FIG. 1 is a block diagram illustrating an intermittent operation circuit according to an embodiment 1 of the present invention. In FIG. 4, the same reference numerals as designated in the drawings of the prior art designate the same or corresponding parts of the present invention. Thus, the explanation thereof is omitted.

Figure 7:
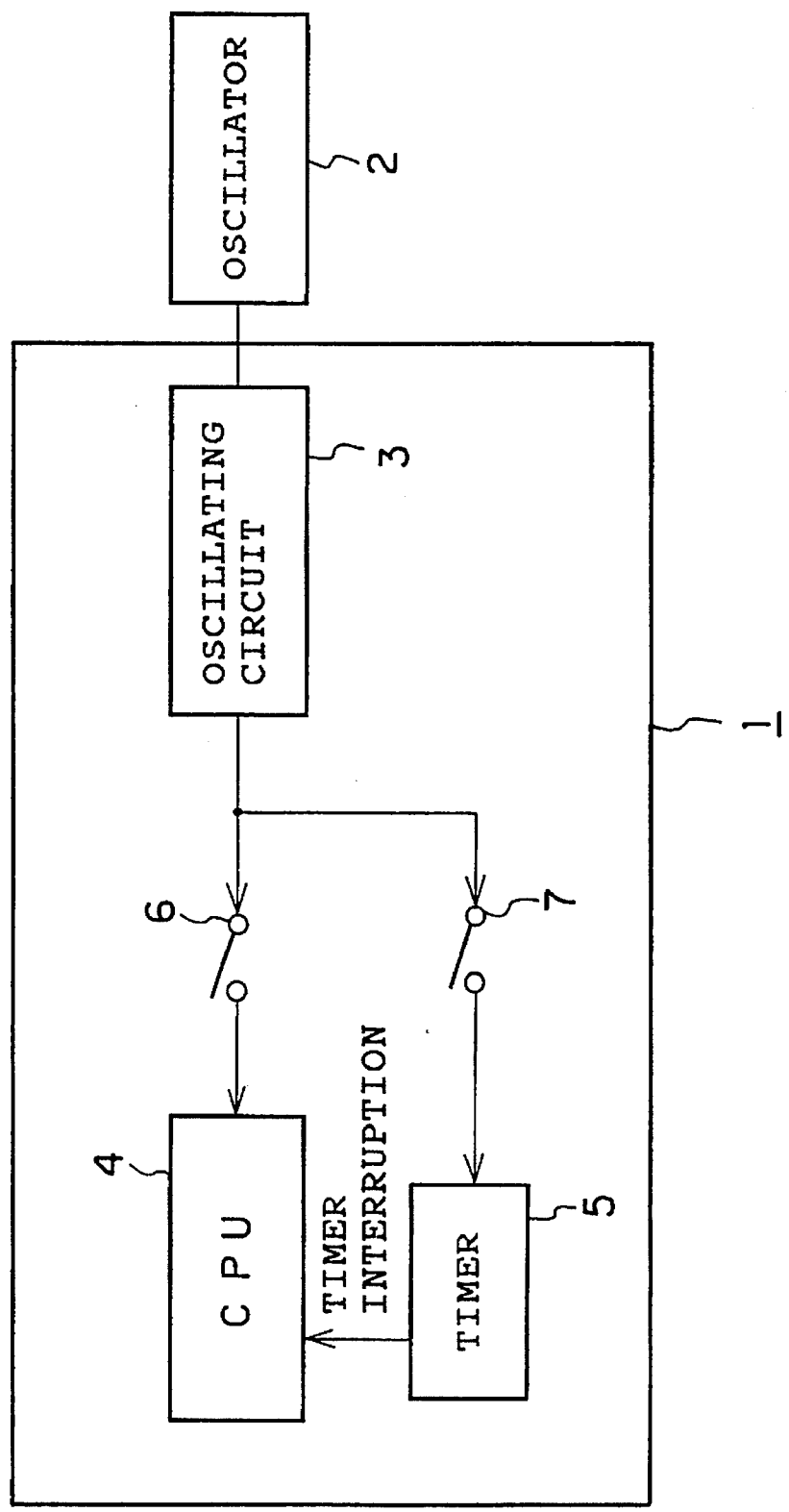
FIG. 7 is a block diagram illustrating a conventional intermittent operation circuit.
Figure 8:
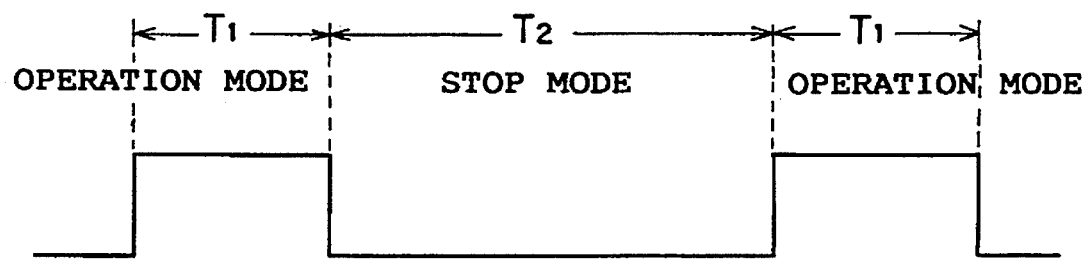
FIG. 8 is a mode transition diagram illustrating the mode transition of the microcomputer 1.

The reference numeral 11 designates a timer which divides an internal clock signal generated from an oscillation circuit 3 and counts the divided clock pulses and then generates the timer interruption in a CPU 4 when the count value is decreased to reach an underflow. It should be noted that, different from the timer 5 in the prior art circuit shown in FIG. 7, the timer 11 in FIG. 1 does not generate the timer interruption to intermittently operate the CPU 4, but it generates another timer interruption so that a CPU (central processing means) 12 executes any other processing which are not related to the intermittent operation.

The reference numeral 12 designates a CPU which operates in synchronism with the internal clock signal generated from the oscillation circuit 3 and stops the operation of the oscillation circuit 3 when the mode of the CPU 12 is transferred to the low consuming power mode to temporarily stop its operation, 13 a power source, 14 a resistor, 15 a capacitor, 16 a current-limiting resistor, 17 a MOS transistor used as a charge/discharge switching means, which discharges the stored electric charge to a ground 18 (the MOS transistor 17 is hereinafter referred to as merely transistor 17), and 19 an I/O port of the microcomputer.

The power source 13, the resistor 14, and the capacitor 15 form a charge storage means. This charge storage means and the transistor 17 form a charge/discharge means which once discharges the stored charge and starts charging when the CPU stops the operation of the oscillation circuit 3.

The reference numeral 20 designates an interruption control circuit (an interruption control means) which judges the return of the charging level of the capacitor to a given value or more when the level of the voltage V across the ends of the capacitor 15 is once lowered and the voltage level reaches or exceeds a set value of Vth, and starts the operation of the oscillation circuit 3 and the CPU 12.

Figure 2:
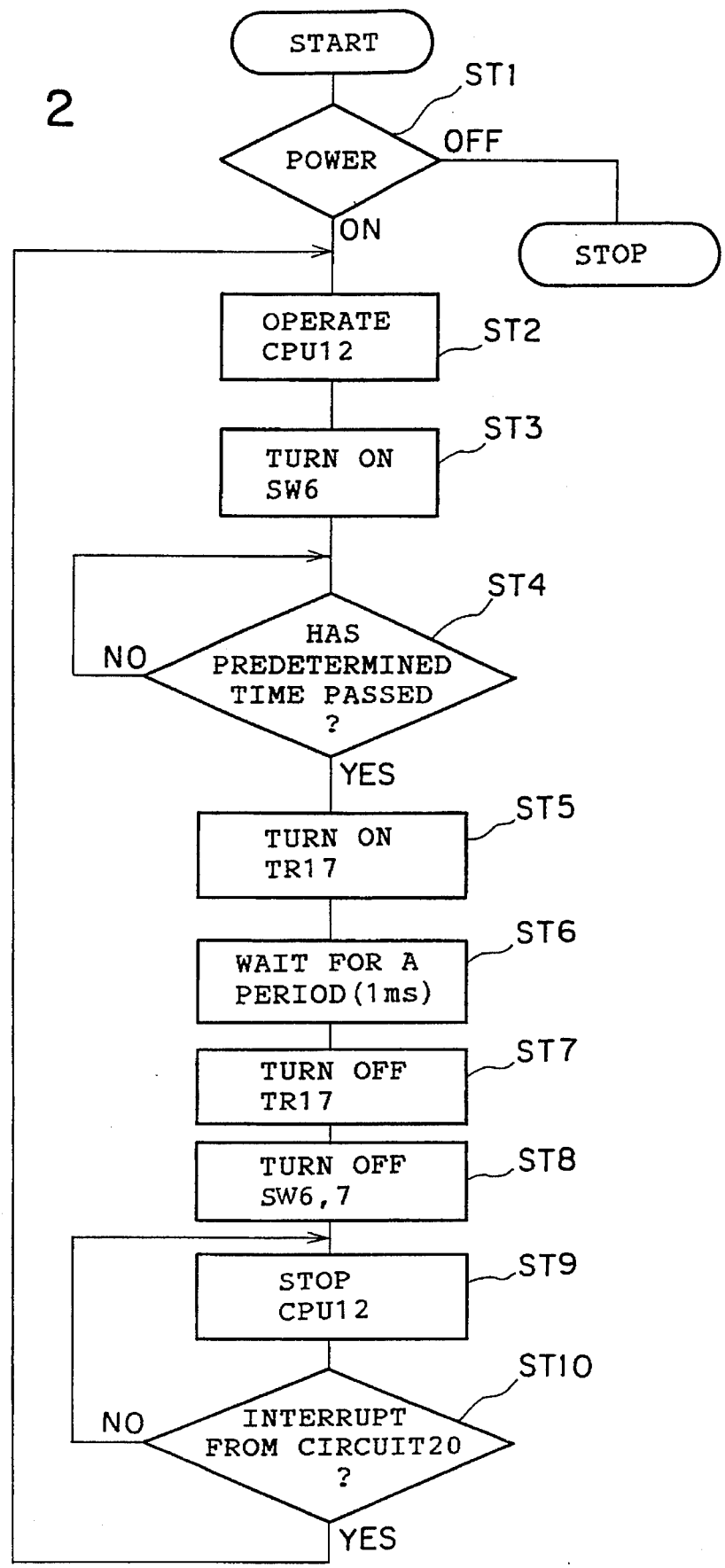
FIG. 2 is a flowchart explaining the operation of CPU 12 in the intermittent operation circuit illustrated in FIG. 1.
Figure 3:
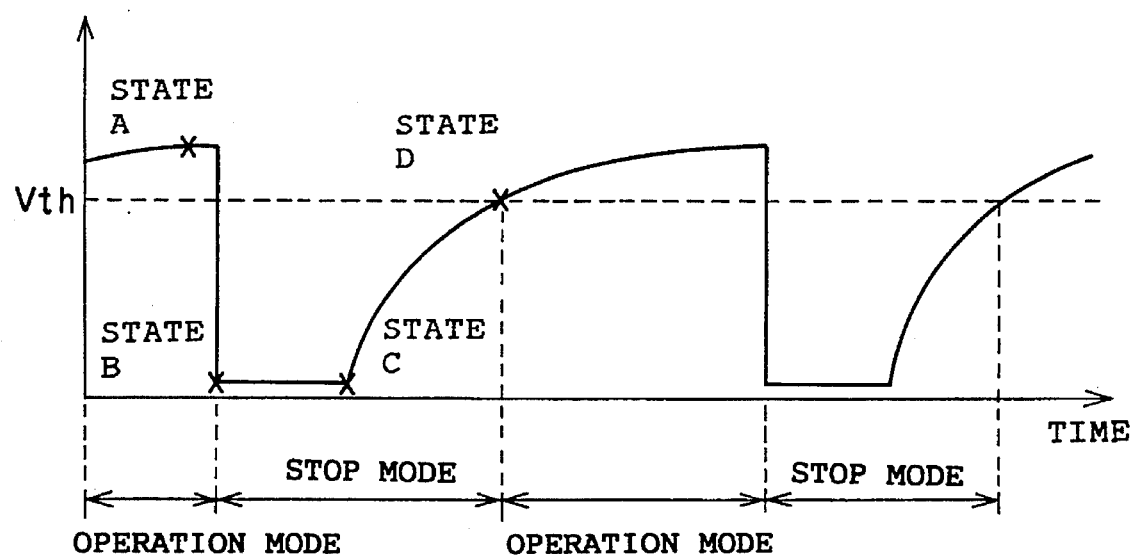
FIG. 3 is a waveform of the voltage across the ends of a capacitor 15.

The operation of the intermittent operation circuit illustrated in FIG. 1 will be described in connection with the flowchart of FIG. 2 and the voltage waveform diagram of FIG. 3.

When a power source (not shown) of the microcomputer 1 is turned ON in a step ST1, the oscillation circuit 3 starts its operation. After the oscillation circuit 3 has started its operation, it takes a time of, for example, about 1 msec to generate a stable internal clock signal. Accordingly, the CPU 12 starts its operation after the power source is turned ON and the above-described time has passed. After the operation of the CPU 12 has started (step ST2), the CPU 12 turns the switches 6 and 7 ON (step ST3).

By turning ON the switch 6, the clock signal is supplied to the CPU 12 so that the CPU 12 is in an operation mode. Also, by turning ON the switch 7, the clock signal is supplied to the timer 11 so that the timer 11 switches to an operation mode. Since the timer 11, however, has no relationship to the intermittent operation of the CPU 12, the switch 7 is not necessarily turned ON when the CPU 12 starts its operation.

After the transistor 17 is turned OFF, charging of the capacitor 15 is started. When the CPU 12 switches to the operation mode, it counts a predetermined time necessary for the intermittent operation internally (step ST4). This predetermined period of time corresponds to the operation mode illustrated in FIG. 3. Before the supply of power to the microcomputer 1, the transistor 17 is in an OFF state. Accordingly, the voltage across the ends of the capacitor 15 is in the state A of FIG. 3. When the predetermined time has passed (YES in step ST4), the CPU 12 turns the transistor 17 ON (step ST5) so that the charges stored in the capacitor 15 are discharged and the voltage across the ends of the capacitor 15 is transferred from the state A in FIG. 3 to the state B therein. Then, the CPU 12 waits for only a predetermined period of time, for example, 1 msec (step ST6). This wait period corresponds to the transition period from the state B to the state C in FIG. 3. After that, as the step ST7, the CPU 12 turns the transistor 17 OFF again to start charging the capacitor 15 (the state C in FIG. 3). Then, as the step ST8, the CPU 12 turns the switches 6 and 7 OFF. Accordingly, the timer 11 stops its operation and no clock signal is supplied to the CPU 12, whereby the CPU 12 stops its operation 12 in the step ST9. The interruption control circuit 20 monitors a charging voltage across the capacitor 15. When the voltage across the I/O port 19 is a given threshold value Vth or less, the interruption control circuit 20 stops the operation of the oscillation circuit 3. When the voltage across the I/O port 19 exceeds the Vth (the state D in FIG. 3), the interruption control circuit 20 outputs a starting signal to the oscillation circuit 3 and immediately outputs an interruption signal to the CPU 12. After the CPU 12 receives this interruption signal (shown as YES in the step ST 10 in FIG. 2) and the oscillation operation has stabilized, the CPU 12 resumes operation (the step ST2).

Consequently, the CPU 12 again switches to the operation mode thereby realizing the intermittent operation of the CPU 12. Therefore, the period from the step ST6 in FIG. 2 until the time when the interruption signal is supplied to the CPU 12 in the step ST 10 corresponds to the period of the stop mode (the low consuming power mode) in FIG. 3. Further, the period, from the time the operation of the CPU 12 is started in the step ST2 after the interruption signal is supplied to the CPU 12 in the step ST10, until time when the predetermined time is counted in the step ST4, corresponds to the operation mode in FIG. 3.

Since the timer 11 has no relationship to the intermittent operation of the CPU 12, the operation of the CPU 12 is not necessarily restored. Nevertheless, when the operation of the CPU 12 is to be restored, the CPU 12 can be restore by turning the switch 7 on.

A condition for setting the time of the stop mode of the CPU 12 to a given time will be hereinafter described.

When the value of the resistor 14 is R and the value of the capacitor 15 is C, the following expression holds:

$$Vth = E(1 - \epsilon^{-t/RC}) \quad (1)$$

wherein E is the power voltage of the power source 13 and Vth is the predetermined value.

The expression (1) is changed to the following expression if it is solved with respect to RC:

$$RC = -t/\log(1 - Vth/E) \quad (2)$$

Accordingly, when the time t of the stop mode is 100 msec, the power voltage of the power source 13 is 5 V, and the set value Vth is 3 V, then RC can be expressed as: RC =109. Therefore, when the capacitance C of the capacitor 15 is 1 μF, and the value R of the resistor 14 is 109 KΩ, the time t of the stop mode can be set at 100 msec.

In this embodiment 1, when the CPU is in the stop mode, the capacitor 15 must be charged. Therefore, a charging current I in the capacitor 15, which is not needed in the prior art is needed in the embodiment 1, so that the consuming power is increased by that amount. Nevertheless, the charging current I is extremely small in comparison with the current which flows in a stop mode in the above-described prior art, and which is the current flowing through the timer 5 and the oscillation circuit 5 in FIG. 7. Thus, according to the embodiment 1 of the present invention, the consuming power in the stop mode can be 1/100 that of in the prior art.

Incidentally, when the time t of the stop mode is 100 msec, the power voltage of the power source 13 is 5 V, the capacitance C of the capacitor 15 is 1 μF, and the value R of the resistor 14 is 100 KΩ, the charging current I reaches about 18 μA as follows:

$$\begin{aligned} I &= (E/R) * \epsilon^{-t/RC} \\ &= (5/100) * \epsilon^{-100/1*100} \\ &= 18 \mu A. \end{aligned}$$

Embodiment 2

In the above-described embodiment 1, an intermittent operation circuit in which the output of the transistor 17 and the output of the interruption control circuit 20 is connected to the I/O port 19 of the microcomputer 1 has been described. However, in a case where an intermittent operation circuit has no I/O port such as the double-functioned I/O port 19 of the microcomputer 1, the output of the open drain 17 may be connected to an output port 21 of the microcomputer 1 and the input of the interruption control circuit 20 may be connected to an interruption function port 22, as shown in FIG. 4. This modification can lead to substantially the same effects as in the embodiment 1.

Embodiment 3

In the embodiment 1, an intermittent operation circuit in which the power source 13, resistors 14 and 16 and the capacitor 15 are provided outside the microcomputer 1 has been described. The above described elements such as power source 13 and others, however, may be provided inside the microcomputer 1. This modification also can lead to substantially the same effects as in the embodiment 1.

Embodiment 4

Figure 5:
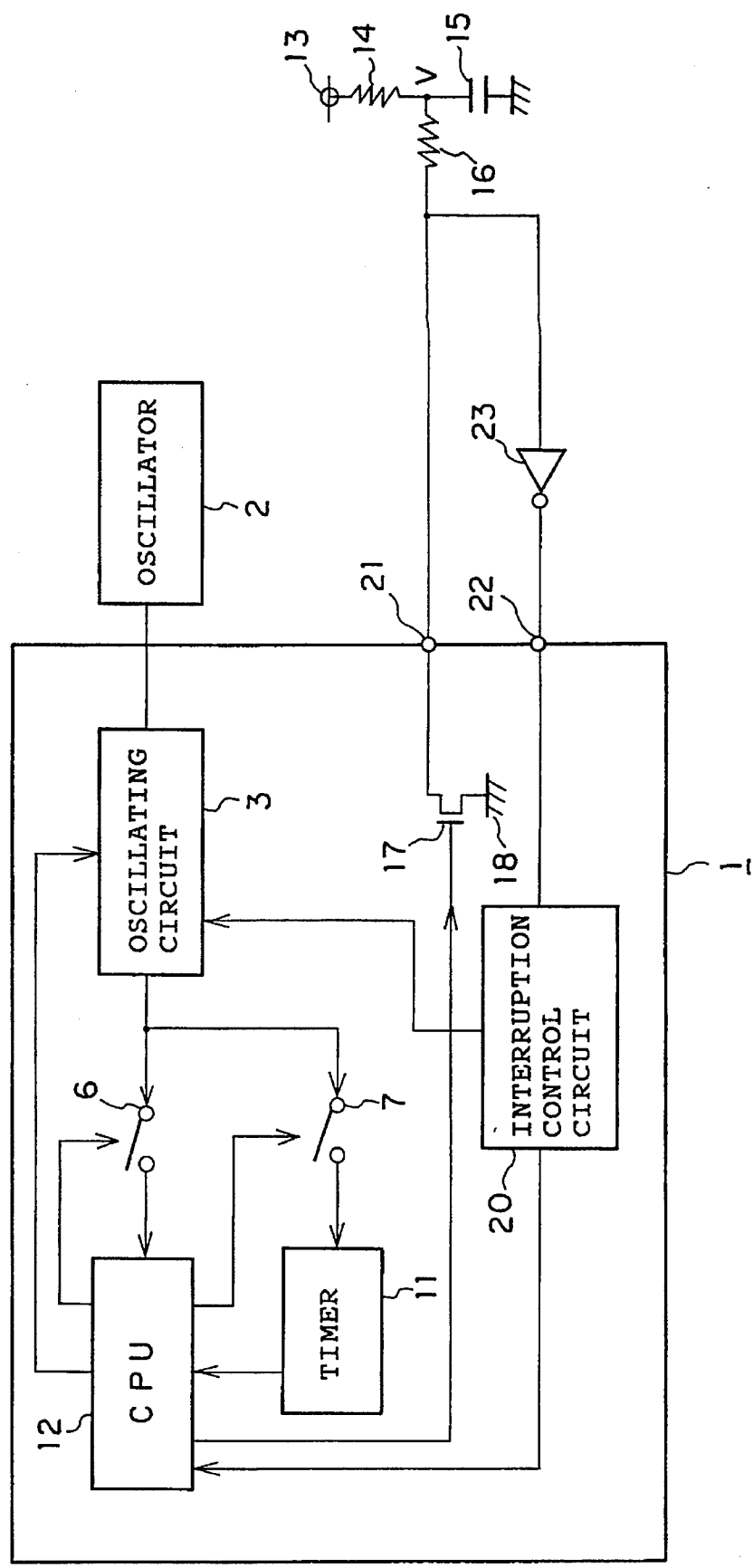
FIG. 5 is a block diagram illustrating an intermittent operation circuit according to the embodiment 4 of the present invention.

In the embodiment 2, an intermittent operation circuit in which the interruption control circuit 20 judges whether or not the terminal voltage V has become higher than the predetermined value Vth has been described. However, the output of an inverting circuit such as the inverter 23 which inverts the terminal capacitor 15 may be connected to the interruption function port 22 so that the interruption control circuit 20 judges whether or not the terminal voltage V has become higher than the predetermined value Vth, as shown in FIG. 5. This modification also can lead to substantially the same effects as in the embodiment 2.

Embodiment 5

Figure 6:
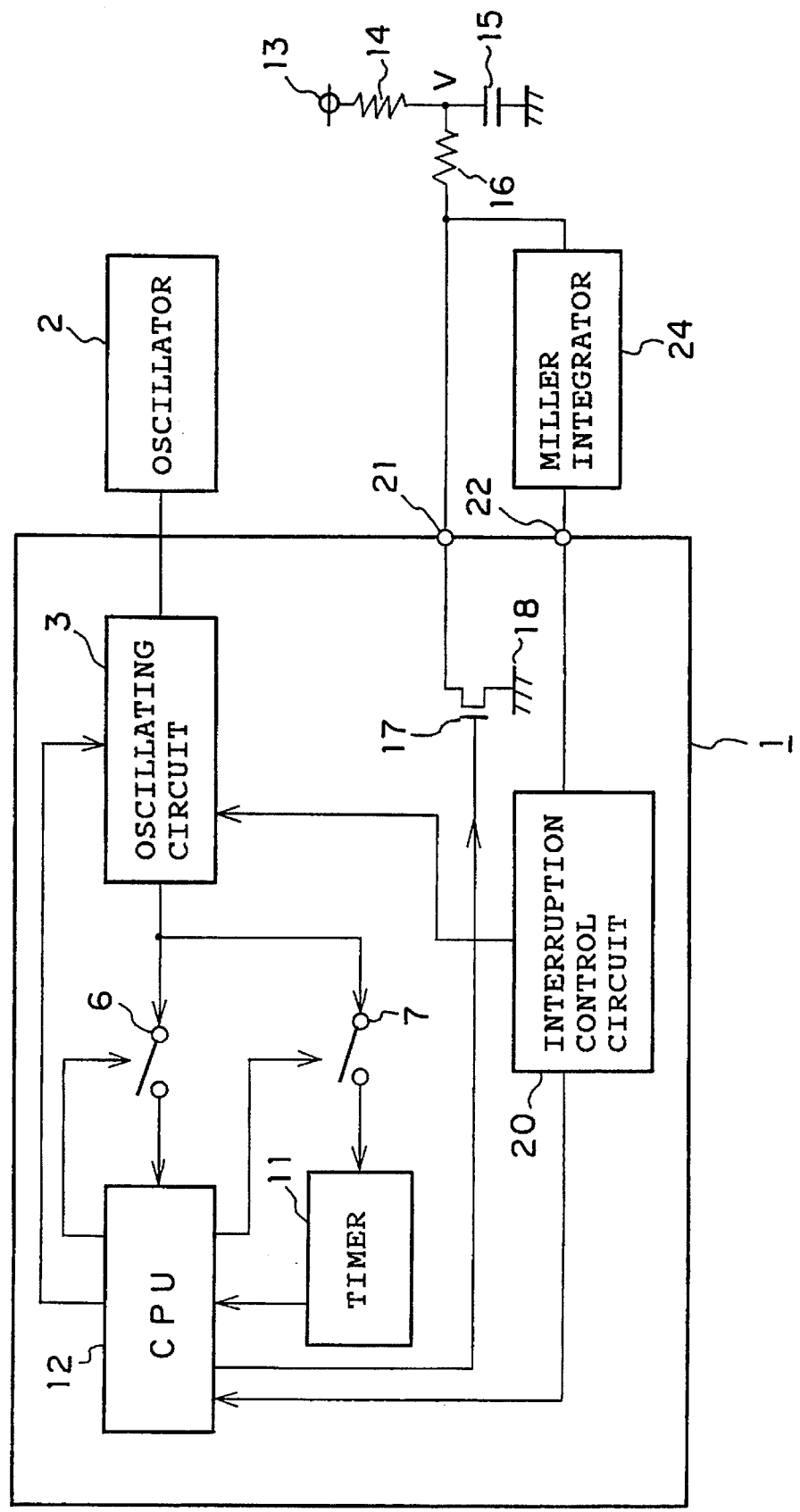
FIG. 6 is a block diagram illustrating an intermittent operation circuit according to the embodiment 5 of the present invention.

FIG. 6 is a block diagram illustrating an intermittent operation circuit according to the embodiment 6 of the present invention. In FIG. 6, the reference numeral 24 designates a miller integrator (a waveform shaping means) which shapes the waveform of the terminal voltage V across the capacitor 15 into a linear waveform.

The operation of the circuit will be described. The intermittent operation circuit in the embodiment 5 is the same as in the above-described embodiment 2 except that the Miller integrator is provided. Therefore, only the Miller integrator 24 will be described.

As described above, when the values of the resistor 14 and the capacitance 15 are appropriately set, the time t of the stop mode of the CPU 12 can be set to a predetermined time. Nevertheless, when the time t of the stop mode is set to a long time, the terminal voltage across the capacitor 15 is raised in a very gentle curve, because the waveform of the terminal voltage across the capacitor 15 has curved portions as shown in FIG. 3.

Therefore, the interruption control circuit 20 is not correctly able to judge the stop time of the CPU 12 only by comparing the terminal voltage V across the capacitor 15 with the set value Vth. The reason for this is that if the variation of the terminal voltage V is extremely small, the stop time corresponding to this variation is extremely long. Consequently, a large error occurs in the stop time of the CPU 12.

For this reason, the terminal voltage V across the capacitor 15 is input to the Miller integrator 24 to shape a waveform of the terminal voltage V to a linear waveform. Accordingly, even if the time period t of the stop mode is set to be longer, the terminal voltage V is linearly increased. Thus, the relationship between the terminal voltage V and the stop time becomes clear because the terminal voltage V is proportional to the stop period. Accordingly, the interruption control circuit 12 is correctly able to judge the stop time of the CPU 12 only by comparing the terminal voltage V across the capacitor 15 with the set value Vth.

Incidentally, when the gain of the amplifier in the Miller integrator is set to "G", the time constant of the series circuit composed of the resistor 14 and the capacitor 15 becomes (1+G) times. Accordingly, when G =100 is set for example, the time constant of the series circuit becomes 101 times in comparison with a case where the Miller integrator is not provided, with the result that the time t of the stop mode can be easily set to a long time only by the arrangement of the Miller integrator 24.

As described above, according to the first aspect of the present invention, a charge/discharge means in which, when the central processing means stops the operation of the internal clock oscillating means, a charging is started after discharging a stored once, is provided, and an interruption control means which starts the operations of the internal oscillating means and the central processing means when a charge level of the charge stored in the charge/discharge means is once lowered and the charge level reaches or exceeds a predetermined value is provided. Therefore, when the central processing means is in the stop mode, the operation of the processing means can be restored, without operating the timer and the internal clock oscillating means. Consequently, the dissipation of the circuit system can be further reduced than in the prior art.

According to the second aspect of the invention, the charge/discharge includes a series circuit composed of a power source, a resistor and a capacitor. Therefore, the stop time of the central processing means can be set by only setting the values of a resistor and a capacitor, and the charge/discharge means can be composed of a simple circuit.

According to the third aspect of the invention, a waveform shaping means for shaping a waveform of the terminal voltage across the capacitance in the charge/discharge means to a linear waveform is provided, and the charging level of the charge/discharge means is determined on the basis of the waveform shaped by the waveform shaping means. Accordingly, even in a case where the stop time of the central processing means was set to a long time, the charging level of the charge/discharge means can be accurately determined. Consequently, the stop time of the central processing means can be set to a long time.

According to the fourth aspect of the invention, the charge/discharge switching means is controlled by the central processing means. Accordingly, the charge/discharge is appropriately executed, whereby the operation of the interruption control means is secured.

What is claimed is:

1. An intermittent operation circuit comprising:

an internal clock oscillating means for generating an internal clock signal;

a central processing means which operates in synchronism with the internal clock signal generated by said internal clock oscillating means, and stops an operation of said internal clock oscillating means when the mode is transferred to a low consuming power mode in which the operation of itself is temporarily stopped;

a charge/discharge means in which, when said central processing means stops the operation of said internal clock oscillating means, a charging is started after discharging a stored charge once; and an interruption control means which starts the operations of said internal oscillating means and said central processing means when a charge level of the charge stored in said charge/discharge means is once lowered and the charge level reaches or exceeds a predetermined value.

2. An intermittent operation circuit according to claim 1, characterized in that said charge/discharge means comprises a series circuit composed of a power source, a resistor and a capacitor.

3. An intermittent operation circuit according to claim 2, further comprising waveform shaping means for shaping a waveform of the terminal voltage across the capacitance in said interruption control means to a linear waveform, said interruption control means judging the charging level of said charge/discharge means on the basis of the waveform shaped by the waveform shaping means.

4. An intermittent operation circuit according to claim 2, wherein said charge/discharge means comprises a charge storage means and a charge/discharge switching means which discharges a charge stored in said charge storage means and starts a charging to the charge storage means after the discharge, when said central processing means stops the operation of said internal clock oscillating means.

\* \* \* \* \*